US009575181B2

United States Patent
Bayha et al.

(10) Patent No.: US 9,575,181 B2
(45) Date of Patent: Feb. 21, 2017

(54) VEHICLE OPTICAL MEASURING APPARATUS HAVING A DEFLECTION MIRROR ARRANGEMENT, DRIVER ASSISTANCE DEVICE HAVING SUCH A MEASURING APPARATUS, AND VEHICLE HAVING A CORRESPONDING MEASURING APPARATUS

(75) Inventors: Heiner Bayha, Satow (DE); Peter Horvath, Vaihingen A. D. Enz (DE); Jens Nicolai, Neupetershain (DE)

(73) Assignee: VALEO Schalter und Sensoren GmbH, Bietigheim-Bissingen (DE)

( * ) Notice: Subject to any disclaimer, the term of this patent is extended or adjusted under 35 U.S.C. 154(b) by 275 days.

(21) Appl. No.: 14/131,501

(22) PCT Filed: Jul. 16, 2012

(86) PCT No.: PCT/EP2012/063884
§ 371 (c)(1),
(2), (4) Date: Jun. 25, 2014

(87) PCT Pub. No.: WO2013/010978
PCT Pub. Date: Jan. 24, 2013

(65) Prior Publication Data
US 2014/0326859 A1  Nov. 6, 2014

(30) Foreign Application Priority Data

Jul. 16, 2011 (DE) .................... 10 2011 107 585

(51) Int. Cl.
| G01S 17/06 | (2006.01) |
| G01S 7/497 | (2006.01) |
| G01S 17/93 | (2006.01) |
| G01S 7/481 | (2006.01) |

(52) U.S. Cl.
CPC .............. *G01S 17/06* (2013.01); *G01S 7/4817* (2013.01); *G01S 7/4972* (2013.01); *G01S 17/936* (2013.01)

(58) Field of Classification Search
CPC ...... G01S 17/06; G01S 17/936; G01S 7/4817; G01S 7/4972
See application file for complete search history.

(56) References Cited

U.S. PATENT DOCUMENTS 5,898,482 A * 4/1999 Yamabuchi ............... B60T 7/22
180/169
7,710,545 B2 * 5/2010 Cramblitt .............. G01S 7/4811
356/4.01

FOREIGN PATENT DOCUMENTS

DE    102005055572 B4    8/2007
WO    03/073123 A1    9/2003

OTHER PUBLICATIONS

International Search Report for corresponding International Application No. PCT/EP2012/063884, mailed Jan. 16, 2013 (8 pages).

* cited by examiner

Primary Examiner — Francis M Legasse, Jr.
(74) Attorney, Agent, or Firm — Osha Liang LLP (57) ABSTRACT

The invention relates to an optical measuring apparatus (1) for a vehicle (6), having at least one optical transmitter, at least one optical receiver (12) and a deflection mirror arrangement having at least one deflection mirror (11), wherein the edge contour (27, 28) of a deflection mirror (11) of a reception unit of the measuring apparatus (1) matches the contour (41) formed by marginal rays (40) in a received beam (38). The invention also relates to a vehicle having such an apparatus (1).

13 Claims, 6 Drawing Sheets

VEHICLE OPTICAL MEASURING APPARATUS HAVING A DEFLECTION MIRROR ARRANGEMENT, DRIVER ASSISTANCE DEVICE HAVING SUCH A MEASURING APPARATUS, AND VEHICLE HAVING A CORRESPONDING MEASURING APPARATUS

The invention relates to an optical measuring apparatus for a vehicle, having at least one optical transmitter, at least one optical receiver and a deflection mirror arrangement having at least one deflection mirror. Furthermore, the invention relates to a driver assistance device having such an optical measuring apparatus and to a vehicle having such an optical measuring apparatus.

The prior art discloses scanning optical measuring apparatuses, known as laser scanners, for vehicles for recognizing objects or obstacles in a monitoring region in the vehicle surroundings that determine the distance to objects or obstacles recognized in the monitoring region on the basis of the light pulse propagation time method.

DE 10 2005 055 572 B4 describes a scanning optical distance sensor, for example. This distance sensor comprises at least one laser as an optical transmitter, at least one detector as an optical receiver and a deflection unit that uses a first mirror to deflect laser radiation onto the scene to be considered and uses a second mirror to deflect the laser pulses backscattered by objects onto the at least one detector. In this case, the first and second mirrors are arranged on a common rotatable axis on a respective mounting and driven by a drive unit that is arranged between the two mountings.

U.S. Pat. No. 7,710,545 discloses a comparable system that is used to obtain surroundings information around a vehicle. This system is preferably placed behind the radiator grille of the vehicle, and is used for scanning the anterior region in front of the vehicle for a driver assistance system.

On account of the envisaged setup location for the laser scanner in the vehicle, i.e. for example on the anterior portion in front of the radiator, possibly even directly integrated on the radiator grille, the space requirement for the laser scanner needs to be minimized. The requirements for the setup of the reception unit of the measuring apparatus with the reception lens, the deflection mirror and the sensor, which is usually an APD (Avalanche Photodiode Detector) sensor, are very great. In particular, the alignment of the sensor or of the receiver within the reception unit needs to be performed with very great precision, i.e. to approximately 20 μm.

It is an object of the present invention to provide an optical measuring apparatus and also a driver assistance device having such a measuring apparatus and a vehicle having such a measuring apparatus that is compact in design and one minimized in terms of installation space.

This object is achieved by an optical measuring apparatus, a driver assistance device and a vehicle according to the independent claims.

An inventive optical measuring apparatus for a vehicle comprises at least one optical transmitter, at least one optical receiver and a deflection mirror arrangement having at least one deflection mirror. Provision is made for the edge contour of the deflection mirror of the reception unit of the measuring apparatus to match the contour formed by marginal rays in a received beam. Such an embodiment saves installation space to an exceptional degree. In comparison with conventional embodiments of the deflection mirror, which are usually of rectangular or square design, this surface area minimization of the deflection mirror saves installation space. This insight is based on the arrival of the rays in the optical measuring apparatus and particularly in the reception unit involving said rays passing through via a reception lens and being diffracted according to the shape of this reception lens. After emerging from the reception lens, they therefore impinge on the deflection mirror with a wholly defined contour for the marginal rays that bound the perimeter of the received beam. Since this contour of the marginal rays is usually smaller than the surface area of the conventional deflection mirrors in the reception units, this wastes installation space. The inventive additional embodiment of the deflection mirror with its wholly defined and specific shape therefore takes account of this optical aspect. The functionality of the deflection mirror remains unrestricted, and installation space for the measuring apparatus can nevertheless be saved. This installation space that has been obtained can now be used to hold other components, such as an adjusting mechanism, mounting elements and other components, for example for the alignment apparatuses.

Preferably, the deflection mirror is shaped such that at least two opposite edge sides that do not run parallel to one another are formed.

In one particularly advantageous embodiment, the deflection mirror has a trapezoidal shape, or is of trapezoidal design. This uses specific minimization of the deflection mirror to take account of the contour of the marginal rays following the departure of the marginal rays that characterize a received beam.

Furthermore, the deflection mirror is of planar design, so that in this case no parabolic mirror is used, in particular. A possible disadvantage of parabolic mirrors, which is that the focus with respect to an existent receiver is reduced, which reduces the sellable tolerance range, resulting in increased costs for production, therefore does not arise in the case of these planar deflection mirrors.

Preferably, the received ray path upstream of the deflection mirror contains the reception lens that has produced the contour of the received beam marginal rays that is produced after the reception lens is penetrated.

In particular, the deflection mirror is arranged obliquely with respect to the reception lens and downstream thereof, in particular is arranged with its tapered end further apart from the rear face of the reception lens than a wider end.

The measuring apparatus preferably has a support on which at least some of the components transmitter, receiver and the deflection mirror arrangement are arranged. This support has a first alignment apparatus formed on it that can set the position of a reception lens of the measuring apparatuses, which reception lens is arranged on the received ray path, relative to the support and/or has a second alignment apparatus formed on it that can set the position of a deflection mirror, which is arranged in the received ray path, relative to the support. The measuring apparatus therefore comprises particularly a reception unit comprising the reception lens and the deflection mirror, which can each be displaced and specifically positioned separately relative to the support.

By virtue of the inventive optical measuring apparatus, it is therefore no longer necessary to have to actively displace or otherwise position the position of the receiver relative to the support in complex and error-prone fashion in order to be able to provide an aligned overall unit. Since, as already discussed above, the alignment needs to take place in the micron range, the inventive optical measuring apparatus can already position the receiver in fixed location particularly on the support, and by contrast said receiver no longer needs to be repositioned. By contrast, the reception lens and/or the deflection mirror can have their position altered more individually and more easily by the alignment apparatuses provided, in particular can also be repositioned precisely in the cited submillimeter range.

The receiver is therefore fitted on the support in a defined position. According to the invention, the alignment is performed by virtue of the deflection mirror arranged in the reception unit and/or the reception lens arranged in the reception unit being displaced separately and accordingly then being fixed in position after correct positioning.

Furthermore, the optical measuring apparatus also comprises a transmission unit that has the optical transmitter, which may be a pulsed-operational laser, for example, and a transmission optical system. The transmission optical system may have one or more deflection mirrors, in particular, which are called transmission deflection mirrors. By contrast, the at least one deflection mirror associated with the reception unit can be called a reception deflection mirror.

Preferably, the reception lens has a retaining frame on which engagement elements for engaging in the first alignment apparatus are formed. The reception lens is therefore directly connected to the support by means of the retaining frame, and in this regard the engagement by means of the engagement elements is effected in the first alignment apparatus integrated in the support.

Preferably, the retaining frame at least partially encompasses, for example also completely encompasses, the perimeter of the reception lens. The mechanically robust mounting and the precise alignment in respect of the setting of the relative position of the reception lens in relation to the support and hence also in relation to the receiver arranged thereon at a fixed location are particularly precise possibilities as a result.

Preferably, a first engagement element is arranged on an underside of the retaining frame and is in the form of a strip-like bracket. This allows the provision of a particularly narrow element that is particularly suited in respect of rectilinear displacement of the reception lens. This also benefits the minimization of installation space to a substantial degree.

Preferably, a first slot-like depression in the first alignment apparatus is formed in a base of the support and a first engagement element of the retaining frame is arranged in the first depression so as to be rectilinearly displaceable in a first spatial direction and/or in a second spatial direction, which is perpendicular thereto, prior to the fixing of the position of the reception lens in relation to the support. Thus, an embodiment that can be particularly highlighted provides an alignment apparatus that allows the reception lens to be altered in terms of position in two mutually perpendicular spatial directions relative to the support and hence also to the optical receiver. The slot-like depression is thereby particularly advantageous in several respects. Since it is integrated in the base and hence recessed, it can be minimized in respect of the physical height of the base and in particular the physical height of the base can be of non-enlarging design. Furthermore, this groove or slot-like depression ensures that the bracket-like engagement element is held on the retaining frame of the reception lens with particular precision for the movement guidance. Hence, the plate-like or strip-like embodiment of the first engagement element can ensure linear displacement of the reception lens in the direction of the slot-like depression. On the other hand, however, it is also possible for the engagement element to be recessed to a greater or lesser extent into this slot-like depression in a perpendicular spatial direction in relation thereto, so that height adjustment for the reception lens relative to the support and hence also to the optical receiver is more or less possible in the second spatial direction too.

Preferably, a second slot-like depression in the first alignment apparatus is formed in a lateral wall of the support and a second engagement element is arranged in the second depression so as to be rectilinearly displaceable in a first spatial direction and/or in a second spatial direction, which is perpendicular thereto, prior to the fixing of the position of the reception lens in relation to the support. The aforementioned advantages apply in similar fashion in this case.

Furthermore, this second slot-like depression provides additional mechanical guidance for the alignment, so that no undesirable tilting or rotation of the reception lens occurs during the rectilinear displacement in the first spatial direction and/or in the second spatial direction relative to the support. Since the two slot-like depressions are also formed on different parts of the support, namely firstly the base and secondly a lateral wall, the aforementioned advantages in respect of the robust positioning and most rectilinear displacement possible are reinforced once again.

Preferably, the second alignment apparatus has a first slot-like depression, which is accessible from above, in a support piece of the support, into which depression a first retaining leg, which is connected to an upper edge of the deflection mirror, can be introduced, wherein the first retaining leg is rectilinearly displaceable relative to the support web in the second spatial direction prior to the fixing of the position of the deflection mirror in relation to the support.

In particular, the second alignment apparatus has a second slot-like depression in a base of the support, into which depression a second retaining leg, which is connected to a lower edge of the deflection mirror, can be introduced, wherein the second retaining leg is rectilinearly displaceable relative to the support in the second spatial direction prior to the fixing of the position of the deflection mirror in relation to the support.

The advantages presented for the displacement of the position of the reception lens relative to the support and hence also to the optical receiver apply in equal measure to the displacement of the position of the deflection mirror relative to the support and hence also to the optical receiver.

Preferably, the relative positions—which are set using the alignment apparatus—of the reception lens in relation to the support and of the deflection mirror in relation to the support are fixed by adhesive bonds.

In particular, therefore, before the position of the cited parts, namely the support, the reception lens and the deflection mirror, in relation to one another is fixed, the relative position of the three components in relation to one another is set very precisely and in a defined and also intentional manner by means of the alteration of the position of the reception lens and/or of the deflection mirror using the alignment apparatuses. Only when these correct relative positions in relation to one another have been found is the position of the cited components in relation to one another fixed by producing the adhesive bonds. The adhesive bonds are produced particularly between the engagement elements of the retaining frame and the slot-like depressions in the base and the lateral walls of the support. Furthermore, the adhesive bonds are also produced particularly between the retaining legs and the slot-like depressions.

Furthermore, the invention relates to a driver assistance device having an inventive optical measuring apparatus or an advantageous embodiment thereof.

Furthermore, the invention also relates to a vehicle having an inventive optical measuring apparatus or an advantageous embodiment thereof, wherein the measuring apparatus is designed to sense objects in the vehicle surroundings. Preferably, the optical measuring apparatus has at least subcomponents arranged at the front, particularly in the region of a radiator grille, on the vehicle.

Further features of the invention can be found in the claims, figures and the description of the figures. The features and feature combinations cited in the description above and also the features and feature combinations that are cited in the description of the figures below and/or that are shown in the figures alone can be used not only in the respectively indicated combination but also in other combinations or on their own, without departing from the scope of the invention.

Exemplary embodiments of the invention are explained in more detail below with reference to schematic drawings, in which.

In the figures, elements that are the same or have the same function are provided with the same reference symbols.

Figure 1:
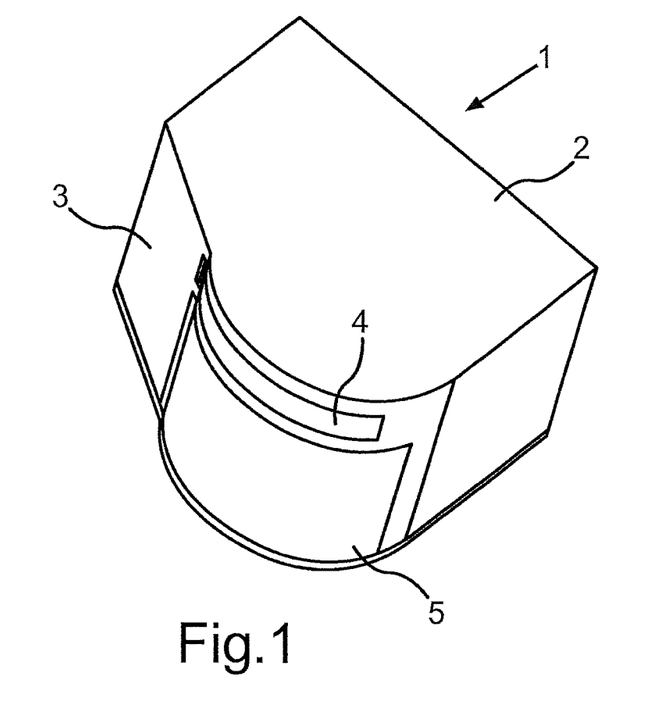
FIG. 1 shows a perspective illustration of an exemplary embodiment of an inventive optical measuring apparatus.

FIG. 1 shows a perspective illustration of an optical measuring apparatus 1 for a vehicle. The optical measuring apparatus 1 comprises a housing 2. In the housing 2, a transmission window 4 is formed on a front wall 3. Pulsed laser light is radiated to the outside through the transmission window 4.

Furthermore, the housing 2 comprises a reception window 5 on the front wall 3 below the transmission window 4. Said reception window is in a larger form than the transmission window 4 in the exemplary embodiment. Laser beams that are radiated back from objects detected in the vehicle surroundings are received via the reception window 5 and are processed by a reception unit that is arranged in the housing 2.

Besides the reception unit, the housing 2 also contains a transmission unit. The transmission unit comprises a transmitter board—not shown—on which, by way of example, an optical transmitter, in the form of a pulsed laser, with a transmission optical system is arranged.

The receiver unit comprises a receiver board—not shown—on which, by way of example, an optical receiver in the form of a detector is arranged, and furthermore also has a reception optical system that can have a reception lens and a deflection mirror as a reception deflection mirror.

The optical receiver is preferably an APD-diode.

Furthermore, the transmission unit may also have a deflection mirror arrangement in the form of one or more transmission deflection mirrors that are arranged with radial spacing on a support or holder in a common horizontal plane, for example.

Furthermore, there may also be yet another operating unit provided that drives the rotatable axis about which the transmission deflection mirrors can be jointly rotated.

The transmission deflection mirrors and the reception unit, particularly the reception lens and the reception deflection mirror, may have an encoding disc arranged between them that can be evaluated in order to determine the angle of rotation of this rotatable axis. Appropriate pickups or sensors may be arranged in order to evaluate the encoding disc.

The optical transmitter at fixed location in the housing 2 produces pulsed laser beams that are deflected by means of said transmission deflection mirrors and radiated through the transmission window 4 into the region of the surroundings that is to be monitored. Pulsed reflected laser beams are received via the reception window 5, said laser beams being reflected from objects or obstacles in response to the emitted pulsed laser beams. The received laser beams are routed to the fixed optical receiver via the reception unit. The output signal from the optical receiver is evaluated in order to ascertain the propagation time of the laser beams, in order to ascertain the distance to a known object in the region of the surroundings.

Figure 2:
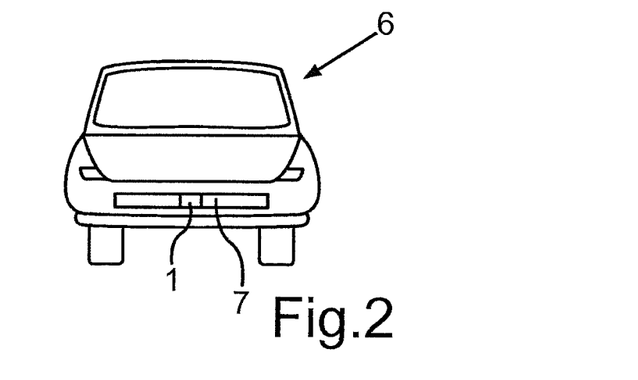
FIG. 2 shows a schematic illustration of an exemplary embodiment of an inventive vehicle having such an optical measuring apparatus.

FIG. 2 shows a vehicle 6 that is a car. FIG. 2 shows a front view of the vehicle 6, the optical measuring apparatus 1 in the exemplary embodiment being arranged at the front in the region of a radiator grille 7, and objects being able to be detected in the region of the surroundings in front of the vehicle 6.

Figure 3:
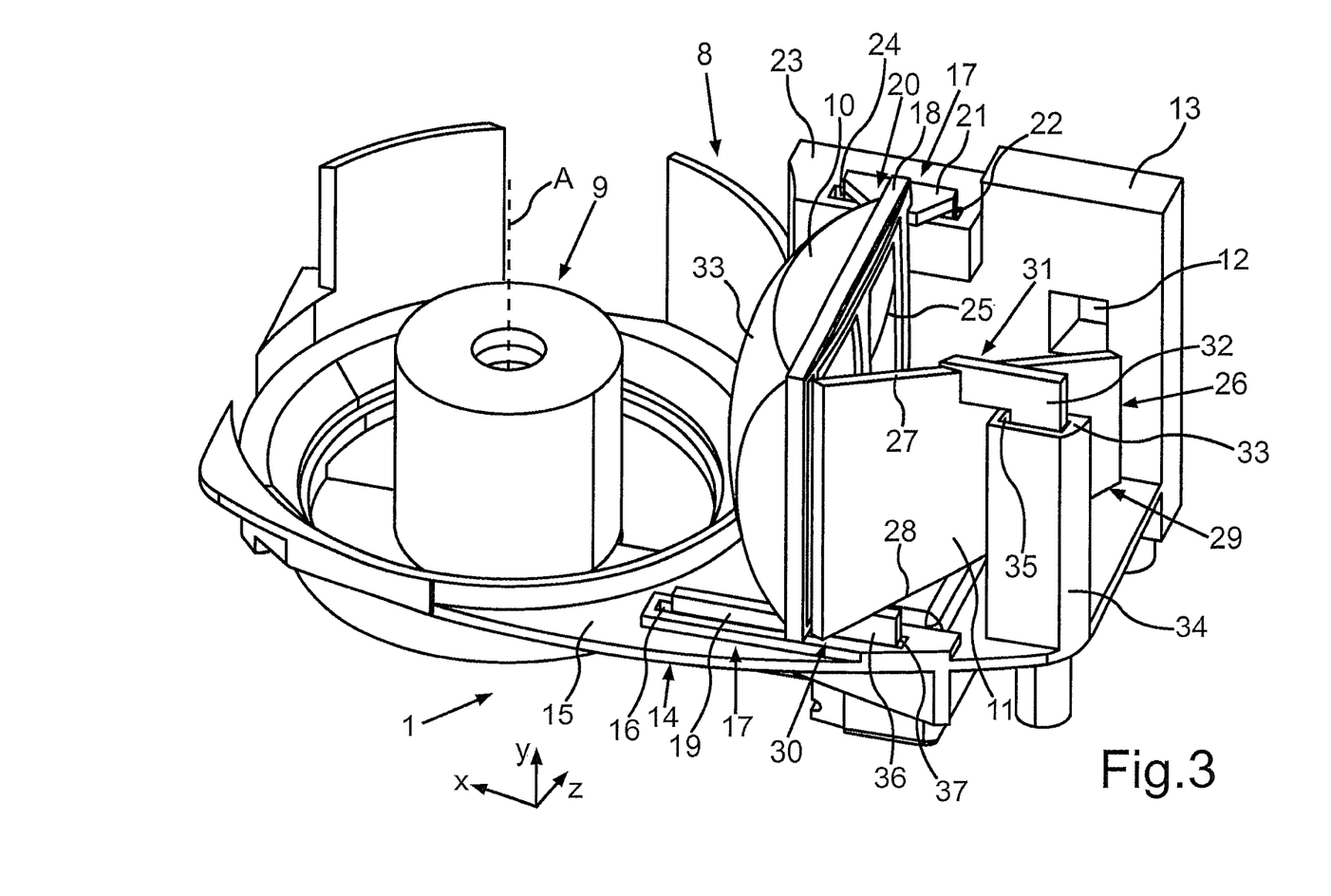
FIG. 3 shows a perspective illustration of subcomponents of an exemplary embodiment of an inventive optical measuring apparatus in a first position for the support, the reception lens and a deflection mirror of the reception unit.

FIG. 3 shows a perspective illustration of an embodiment of subcomponents of the optical measuring apparatus 1. This optical measuring apparatus 1 comprises a support 8 that is formed in a region 9 for holding the rotatably mounted components of a transmission unit, that is to say also the rotatably mounted components of a reception unit. In this case, the rotation can be effected about the axis A that is shown.

For the sake of clarity, these cited components are not shown here. An essential point of the present invention is also able to be explained using the subcomponents shown in FIG. 3.

The support 8, which is arranged inside the housing 2, is designed to hold the aforementioned reception lens 10 and also a deflection mirror 11 associated with the reception unit. Furthermore, the support 8 is designed to hold the fixed optical receiver 12, the latter being arranged in a lateral wall 13 of the support 8, for example.

Furthermore, the support 8, which is particularly made of plastic, of integral design also has a base 14 on which the vertical lateral wall 13 is integrally moulded.

A top 15 of the base 14 has a slot-like depression 16 in a first alignment apparatus 17 formed on it. The first slot-like depression 16 extends rectilinearly.

It extends in a first spatial direction, namely the x direction.

The reception lens 10 is of quadrangular design in respect of its peripheral contour. Its periphery is at least partially enclosed by a retaining frame 18. The lower portion of the retaining frame 18 has a first engagement element 19, which is perpendicular to this portion. This first engagement element 19 is in the form of a strip or a plate-like planar element. According to the illustration in FIG. 3, it is designed to engage in the first slot-like depression 16. As can be seen in that case, the extent of the first engagement element 19 in the x direction is shorter than that of the first depression 16, which means that this engagement element 19 is linearly displaceable in a rectilinear direction in the first spatial direction according to the x direction.

Furthermore, the retaining frame 18 has a second engagement element 20 arranged on it. This engagement element is arranged outwardly on a lateral frame portion. It has a trapezoidal horizontally protruding portion 21, the outer end of which has a vertically downward portion 22 arranged on it.

This second engagement element 20 engages, particularly with the second portion 22, in a further second slot-like depression 24 that is formed on a top 23 of the lateral wall 13. In this case too, this slot-like depression 24 extends in the x direction and is therefore oriented parallel to the first slot-like depression 16. In this case too, the extent of the second slot-like depression 24 in the x direction is greater than the extent of the portion 22 in this x direction. This second engagement element 20 with the portion 22 can therefore also be displaced linearly to and fro in a defined and guided manner in the first spatial direction according to the x direction.

This displacement capability allows the reception lens 10, which is firmly connected to the retaining frame 18, to have its position displaced relative to that of the support 8 and hence also to that of the optical receiver 12 fixed on the support 8.

Furthermore, the depressions 16 and 24 and also the engagement elements 19 and 20 are designed such that not only can a relative displacement of this first spatial direction in the x direction be effected, but also a relative displacement in a second spatial direction that is perpendicular thereto, namely the y direction. The reason is that it is also possible for this reception lens 10 to be displaced upward or downward in relation to the support 8 in the y direction by means of this alignment apparatus 17 and for the engagement elements 16 and 20 nevertheless to continue to be in engagement with the depressions 16 and 24.

Furthermore, it is also ensured that the deflection mirror 11, which is arranged behind in comparison with a rear face 25 of the reception lens 10 that extends particularly in the y-z plane, has an obliquely inclined orientation with respect thereto, as shown in FIG. 3.

As can also be seen from the illustration in FIG. 3, the deflection mirror 11 has an edge contour 26 that is trapezoidal. In this regard, particularly two opposite edge sides 27 and 28 are designed so as not to run parallel.

In the exemplary embodiment, the deflection mirror 11 has a trapezoidal shape and is furthermore of planar design.

As can be seen from the illustration in FIG. 3, a tapered end 29 of the deflection mirror 11 is further apart from this rear face 25 than a wider end 30 of the deflection mirror 11.

Furthermore, the deflection mirror 11 can be positioned by a second alignment apparatus 31 so as to be relatively displaceable, at least in the second spatial direction according to the y direction, in relation to the support 8 and hence also in relation to the optical receiver 12.

The second alignment apparatus 31 has a retaining leg 32 that is firmly connected to the upper edge side 27 of the deflection mirror 11. Furthermore, the retaining leg is arranged so as to engage in a further slot-like depression 35 that is formed on a top 33 of a support web 34 that is seated on the base 14.

Furthermore, the second alignment apparatus 31 has a further retaining leg 36 that is firmly connected to a lower edge side 28 of the deflection mirror 11. This retaining leg 36 is in turn arranged so as to engage in a further slot-like depression 37 that is formed in the base 14.

The deflection mirror 11 can therefore be linearly shifted in precisely guided fashion in said y direction relative to the support 8 and/or the reception lens 10.

This relative position setting for the cited components, namely the reception lens 10, the deflection mirror 11 and the support 8 (and hence the fixed receiver 12) can take place before these cited components are fixed in position in relation to one another. Once the correct alignment has been achieved by this relative position setting capability using the alignment apparatuses 17 and 31, this position can be fixed. To this end, adhesive bonds—not shown in FIG. 3—are produced. These adhesive bonds are produced particularly in the region between the engagement element 19 and the depression 16, the depression 24 and the engagement element 20, the retaining leg 32 and the depression 35 and the retaining leg 36 and the depression 37.

Figure 4:
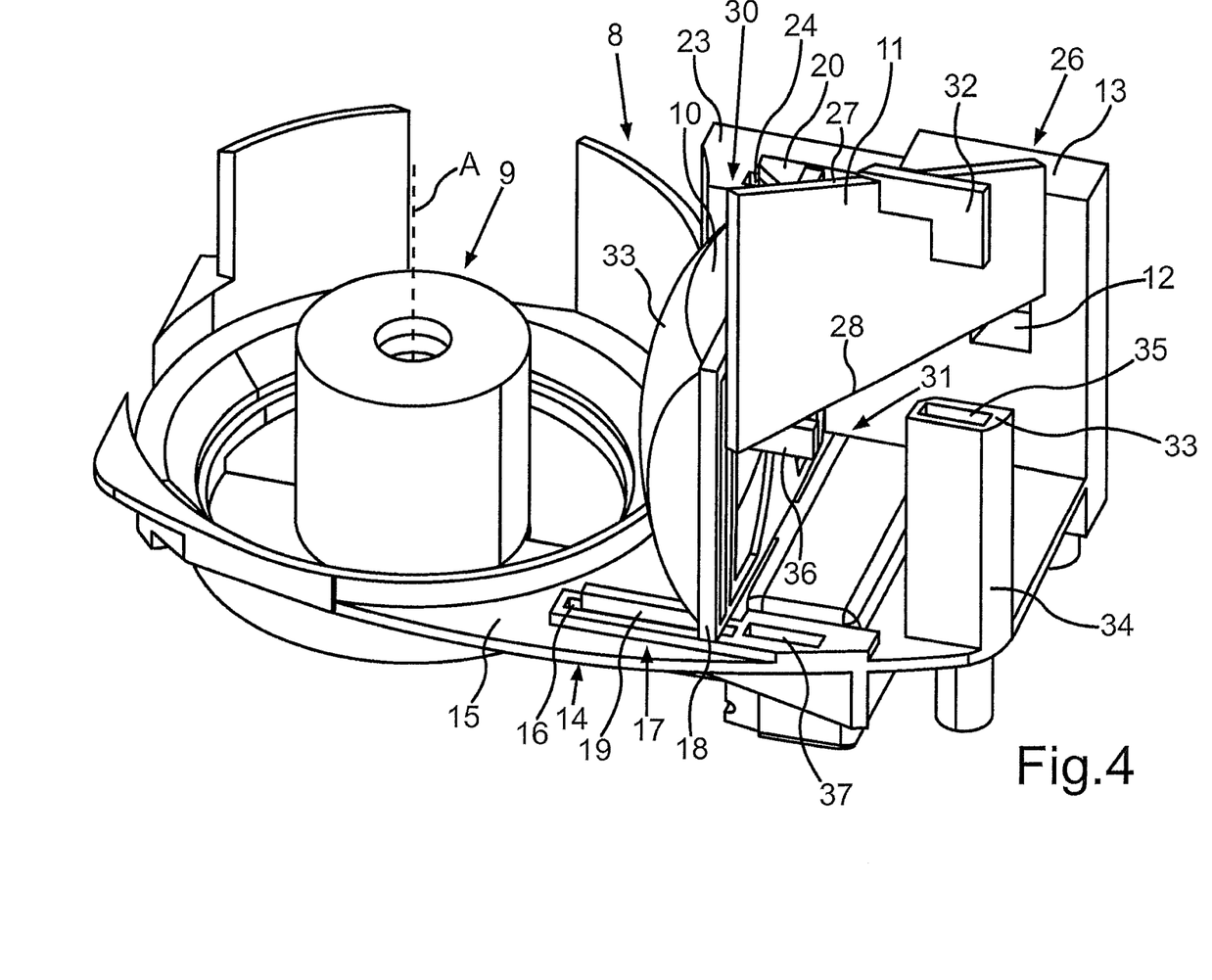
FIG. 4 shows a perspective illustration of the subcomponents shown in FIG. 3 in a second position for the components in relation to one another.

FIG. 4 uses a further perspective illustration of the components shown in FIG. 3 to show a state in which the deflection mirror 11 is shown with the retaining legs 32 and 36 removed from the depressions 35 and 37.

Figure 5:
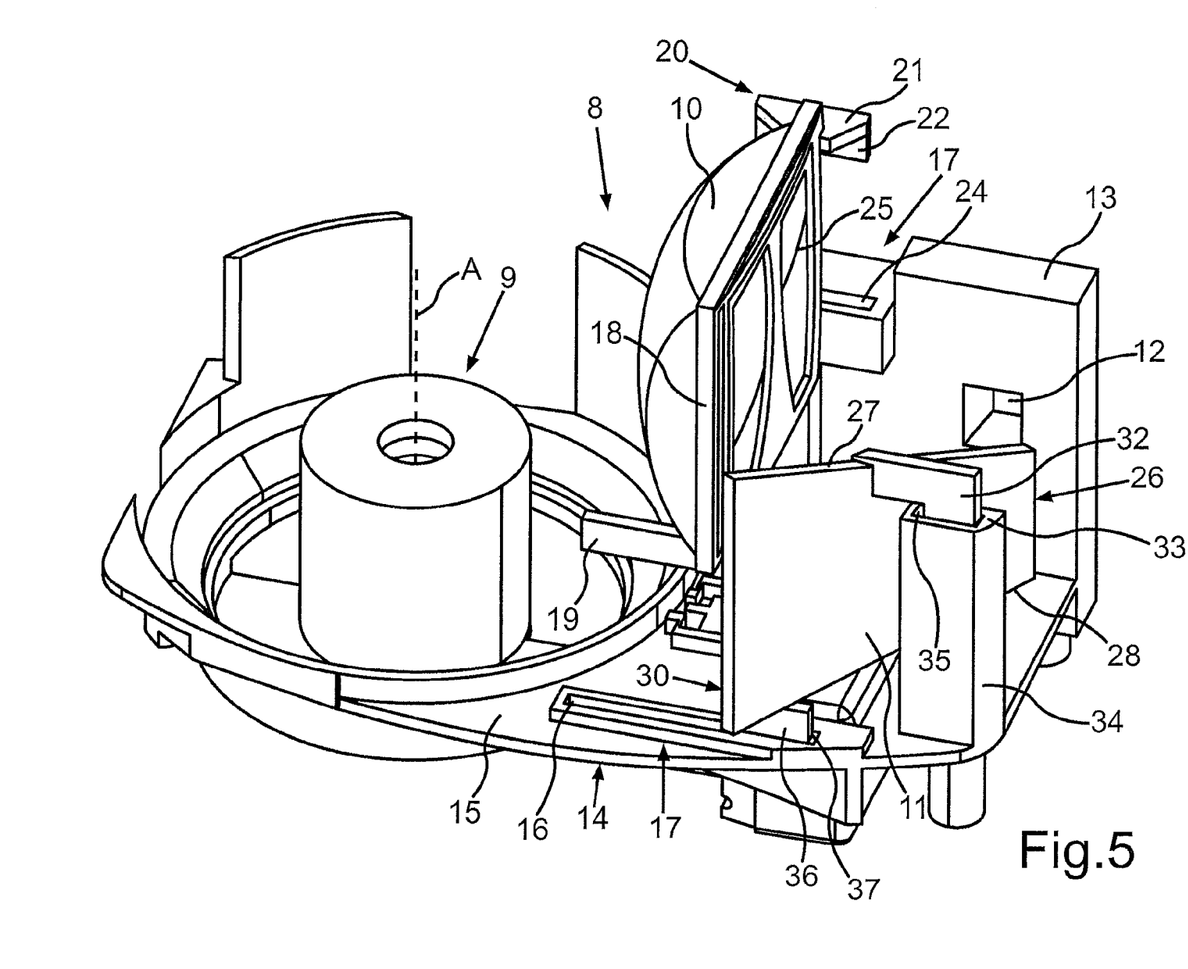
FIG. 5 shows a perspective illustration of the components shown in FIG. 3 and FIG. 4 in a further different position for the components in relation to one another.

By contrast, FIG. 5 shows an illustration of the components shown in FIG. 3 and FIG. 4 in which the reception lens 10 with the retaining frame 18 is shown removed from the slots 16 and 24.

Figure 6:
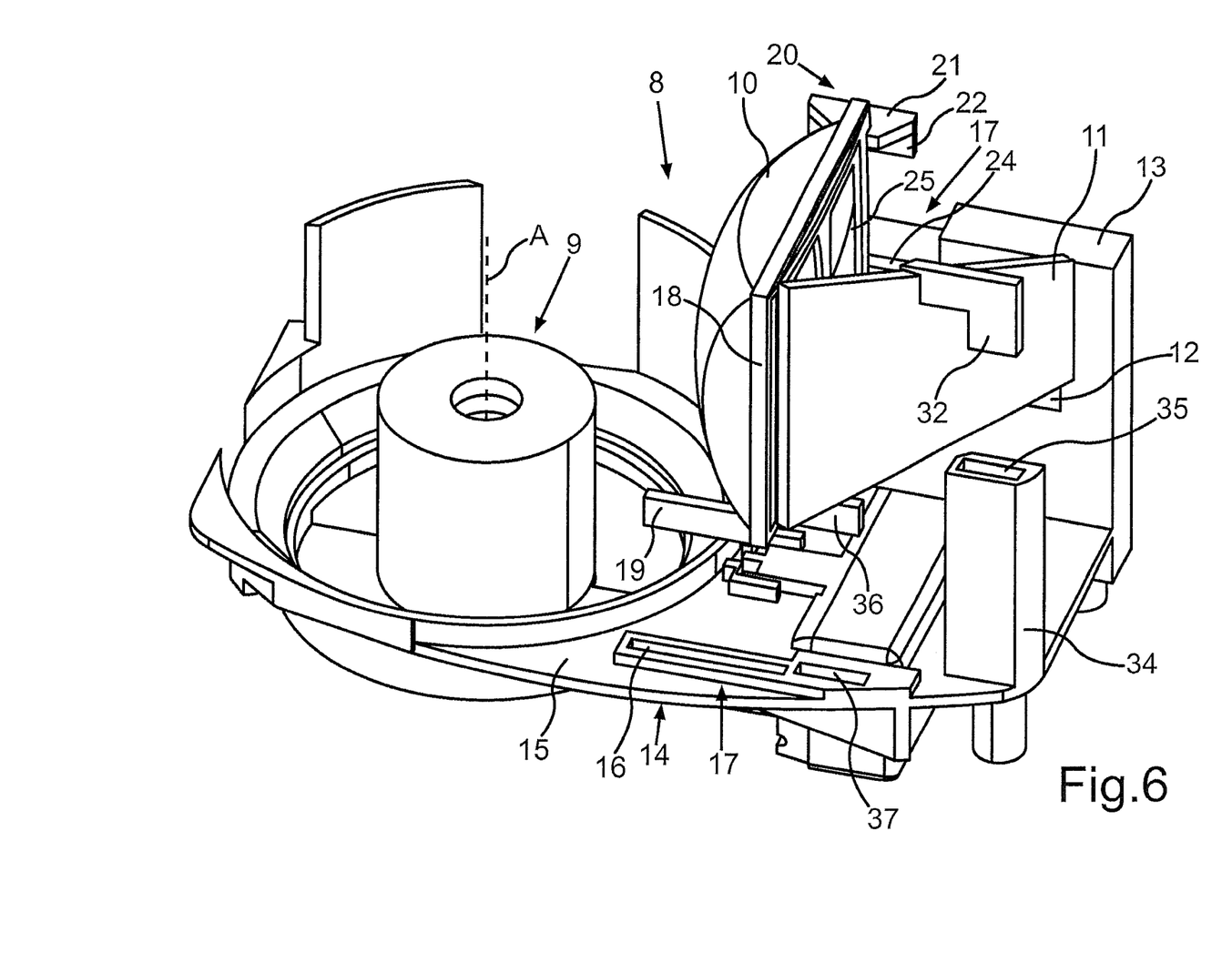
FIG. 6 shows a further perspective illustration of the components shown in FIG. 3 to FIG. 5 in a further exploded illustration of the components.

FIG. 6 uses a further perspective illustration of the components shown in FIG. 3 to FIG. 5 to show the exploded view of the components.

Figure 7:
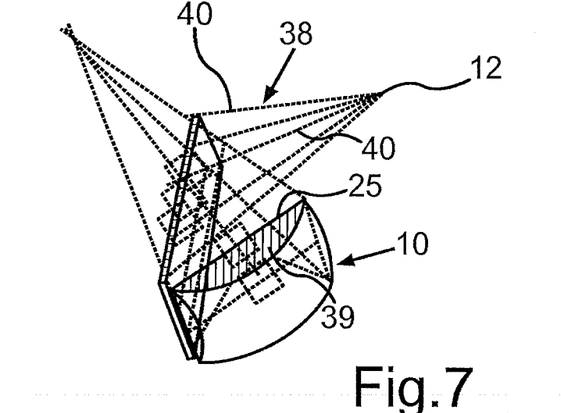
FIG. 7 shows a perspective illustration of the reception lens and of a deflection mirror of a reception unit with a ray profile shown from a received beam.
Figure 8:
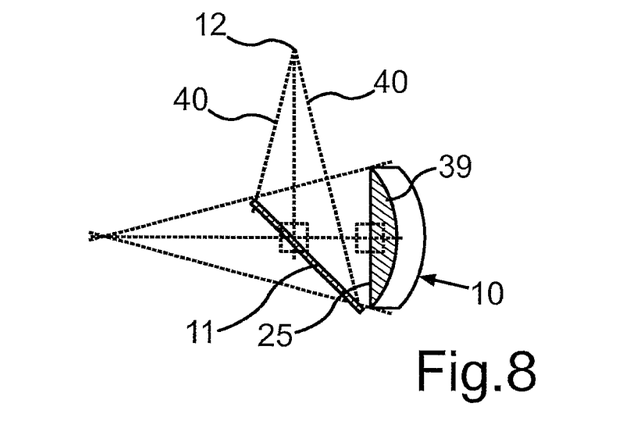
FIG. 8 shows a plan view of the illustration shown in FIG. 7.

FIG. 7 shows a perspective illustration from below the reception lens 10 and the deflection mirror 11, with the ray path of a received beam 38 also being shown furthermore. The received beam 38 passing via the reception window 5 into the housing 2 and arriving at the reception unit of the measuring apparatus 1 impinges on a front side or a front face 39 of the reception lens 10. On account of the curvature thereof, the light is diffracted accordingly in the reception lens 39 and emerges on the essentially planar rear face 25. On account of the incidence of the received beam 38 and on account of the diffraction in the reception lens 10, a received beam 38 is generated downstream of the reception lens 10 that has marginal rays 40 that bound the contour of the received beam 38 and that form a corresponding trapezoidal shape. FIG. 8 shows the plan view of the illustration in FIG. 7.

Figure 9:
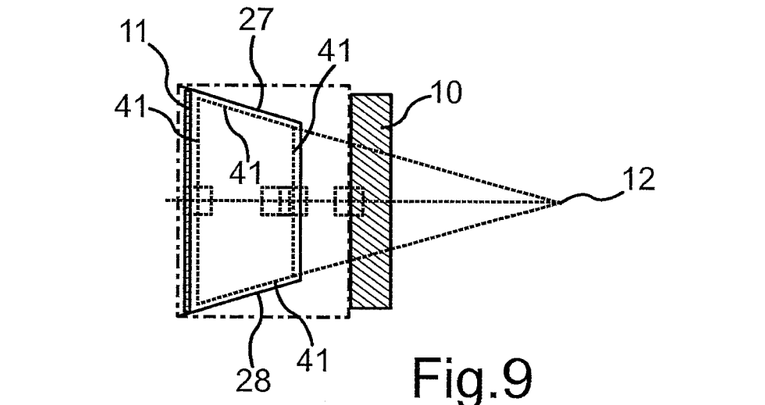
FIG. 9 shows a further perspective illustration of the reception lens and of various shapes of a deflection mirror with the exemplary trapezoidal contour of the marginal rays in the received beam.

FIG. 9 reveals this trapezoidal contour 41 and shows it accordingly. FIG. 9 shows a view of the front face 39 and shows the mirror 11 arranged downstream of the reception lens 10. For the purpose of clarification, FIG. 9 shows the trapezoidal shape of the deflection mirror 11 again, said trapezoidal shape substantially corresponding to the trapezoidal contour 41 of the marginal rays 40 of the received beam 38, in the manner in which they impinge on the deflection mirror 11. To clarify the variability, a conventional rectangular or square deflection mirror is also shown by the dash-dot outline illustration. It can clearly be seen that the conventional shape means that a large surface region of the deflection mirror 11 is not needed at all for deflecting the incident received beam 38, and therefore installation space is unnecessarily taken up in the known conventional embodiments. The quite individual matched-shape embodiment of the new deflection mirror 11 prevents this and nevertheless deflects the entire received beam 38 and routes it to the optical receiver 12.

The invention claimed is:

1. An optical measuring apparatus for a vehicle, comprising:
   at least one optical transmitter;
   at least one optical receiver; and
   a deflection mirror arrangement having at least one deflection mirror,
   wherein the deflection mirror has at least two opposite edge sides that do not run parallel to one another, and
   wherein the deflection mirror has a trapezoidal shape which corresponds to a trapezoidal contour of marginal rays of a received beam, in a manner in which the marginal rays impinge on the deflection mirror.

2. The optical measuring apparatus according to claim 1, wherein the deflection mirror is planar.

3. The optical measuring apparatus according to claim 1, wherein a received beam path upstream of the deflection mirror contains a reception lens that has produced the contour of the marginal rays that is produced after the reception lens is penetrated.

4. A driver assistance device having an optical measuring apparatus according to claim 1.

5. A vehicle having an optical measuring apparatus according to claim 1, wherein the measuring apparatus is designed to sense objects in the vehicle surroundings, and the optical measuring apparatus has at least subcomponents arranged at a front region of a radiator grille on the vehicle.

6. The optical measuring apparatus according to claim 3, wherein the deflection mirror is arranged obliquely with respect to the reception lens, with its tapered end further apart from a rear face of the reception lens than its opposite wider end.

7. The optical measuring apparatus according to claim 1, wherein the measuring apparatus has a support on which a first alignment apparatus is formed that can set the position of a reception lens of the measuring apparatus, which reception lens is arranged in the received ray path, relative to the support and/or a second alignment apparatus is formed that can set the position of the deflection mirror, which is arranged in the received ray path, relative to the support.

8. The optical measuring apparatus according to claim 7, wherein the reception lens has a retaining frame on which engagement elements for engaging in the first alignment apparatus are formed, in particular the retaining frame at least partially encompasses the perimeter of the reception lens.

9. The optical measuring apparatus according to claim 7, wherein a first engagement element is arranged on a lower edge of the retaining frame and is in the form of a strip-like bracket.

10. The optical measuring apparatus according to claim 8, wherein a first slot-like depression in the first alignment apparatus is formed in a base of the support and a first engagement element is arranged in the first depression so as to be rectilinearly displaceable in a first spatial direction and/or in a second spatial direction, which is perpendicular thereto, prior to the fixing of the position of the reception lens in relation to the support.

11. The optical measuring apparatus according to claim 8, wherein a second slot-like depression in the first alignment apparatus is formed in a lateral wall of the support and a second engagement element is arranged in the second depression so as to be rectilinearly displaceable in a first spatial direction and/or in a second spatial direction, which is perpendicular thereto, prior to the fixing of the position of the reception lens in relation to the support.

12. The optical measuring apparatus according to claim 7, wherein the second alignment apparatus has a first slot-like depression, which is accessible from above, in a support web of the support, into which depression a first retaining leg, which is connected to an upper edge side of the deflection mirror, is introduced, wherein the first retaining leg is rectilinearly displaceable relative to the support web in the second spatial direction prior to the fixing of the position of the deflection mirror in relation to the support, and/or the second alignment apparatus has a second slot-like depression in a base of the support, into which depression a second retaining leg, which is connected to a lower edge side of the deflection mirror, is introduced, wherein the second retaining leg is rectilinearly displaceable relative to the support in the second spatial direction prior to the fixing of the position of the deflection mirror in relation to the support.

13. The optical measuring apparatus according to claim 7, wherein the relative positions, set using the alignment apparatuses, of the reception lens in relation to the support and of the deflection mirror in relation to the support are fixed by adhesive bonds.

* * * * *